Nov. 24, 1970    H. MORANTZ ET AL    3,541,692
PLEATER GAUGE
Filed Dec. 19, 1968    4 Sheets-Sheet 1
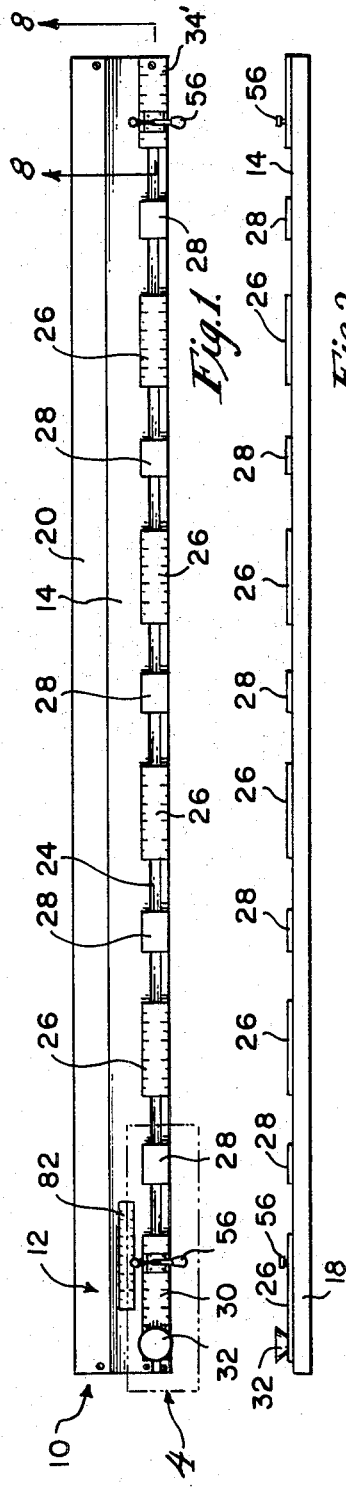
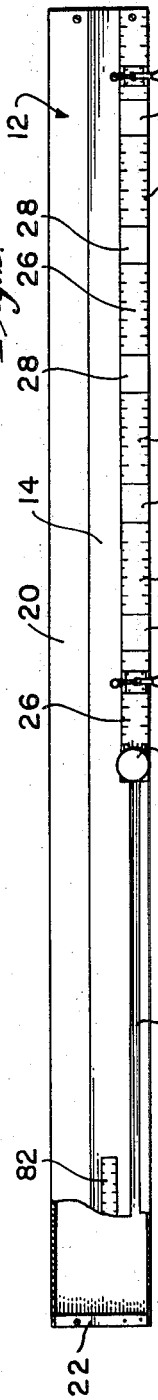
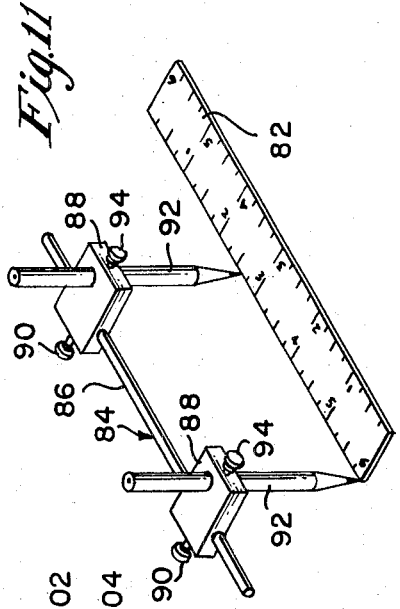
| NO. WIDTHS | NO. SPACES | NUMBER HEADING | | | | | | |
|---|---|---|---|---|---|---|---|---|
| | | 3" | 1/16 | 1/8 | 3/16 | 1/4 | 5/16 | 3/8 | 7/16 |
| 1 | 4 | 12 | 12 1/4 | 12 1/2 | 12 3/4 | 13 | 13 1/4 | 13 1/2 | 13 3/4 |
| 1 1/2 | 6 | 18 | 18 3/8 | 18 3/4 | 19 1/8 | 19 1/2 | 19 7/8 | 20 1/4 | |
| 2 | 9 | 27 | 27 9/16 | 28 1/8 | 28 11/16 | 29 1/4 | | | |
| 2 1/2 | 11 | 33 | 33 11/16 | 34 3/8 | 35 1/16 | 35 | | | |
| 3 | 14 | 42 | 42 7/8 | 43 3/4 | | | | | |
INVENTORS.
HERBERT MORANTZ
STANLEY MORANTZ
BY
*Caesar, Rivise,*
*Bernstein & Cohen*
ATTORNEYS.

Nov. 24, 1970  H. MORANTZ ET AL  3,541,692
PLEATER GAUGE
Filed Dec. 19, 1968  4 Sheets-Sheet 2
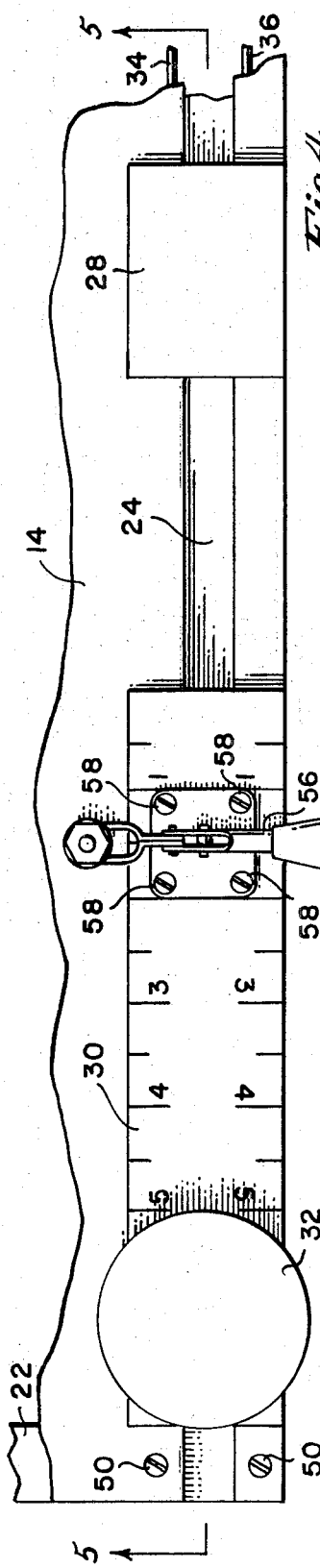
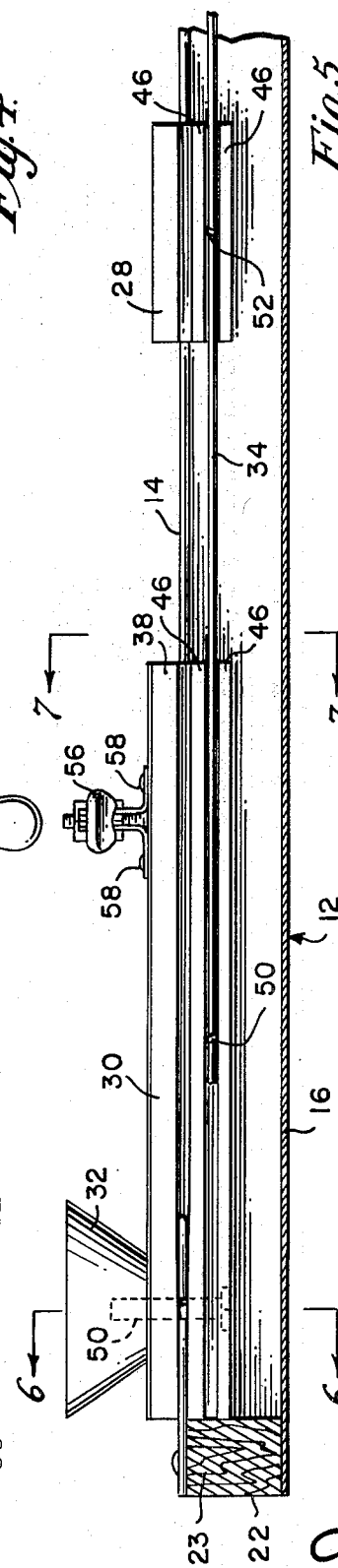
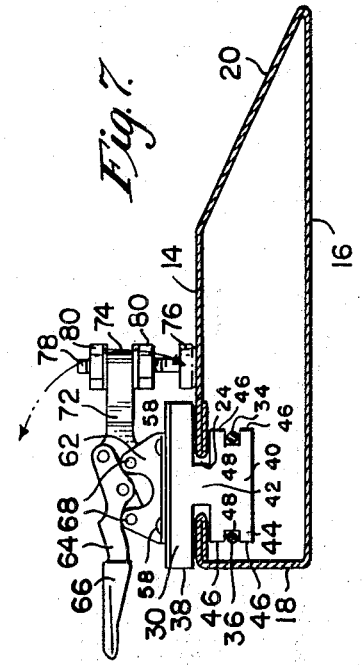
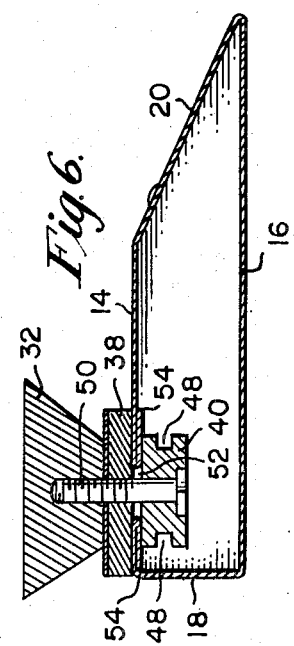
INVENTORS.
HERBERT MORANTZ
STANLEY MORANTZ
BY
Caesar, Rivise,
Bernstein & Cohen
ATTORNEYS.

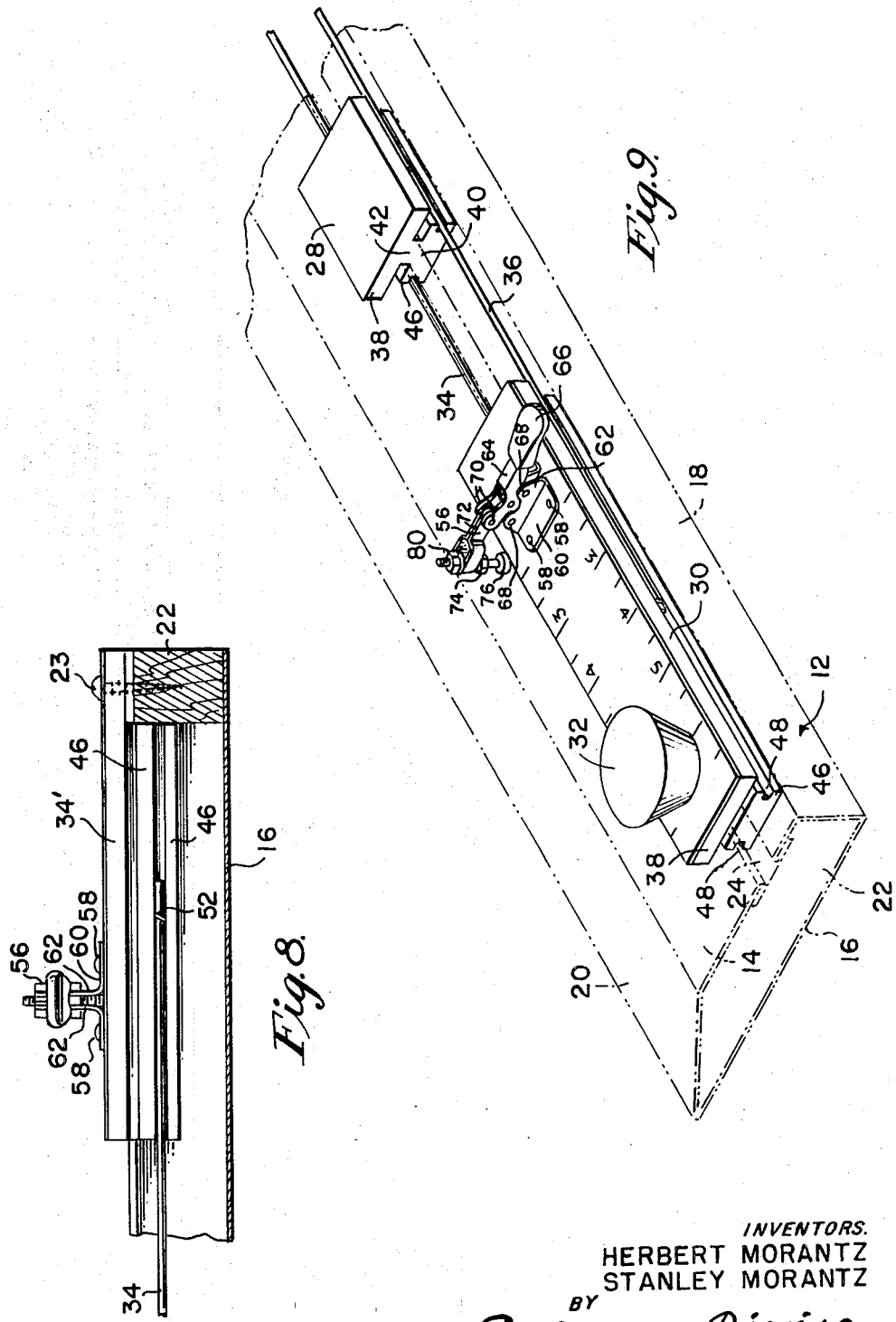

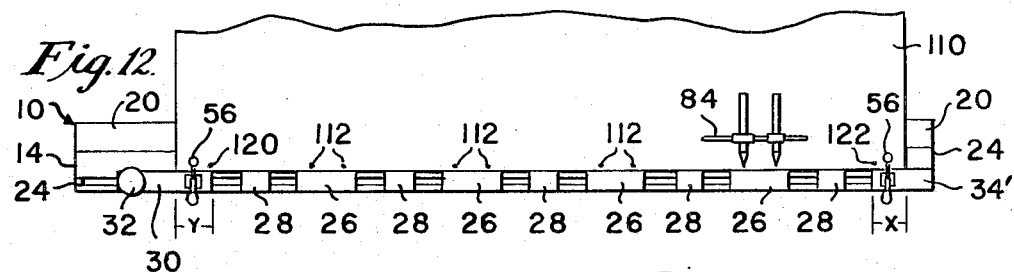
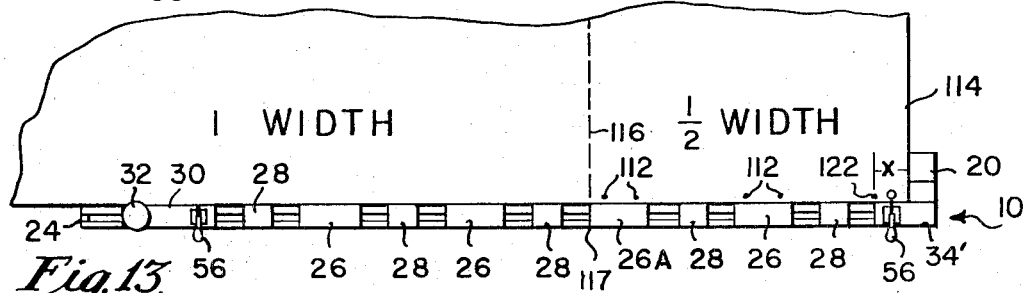
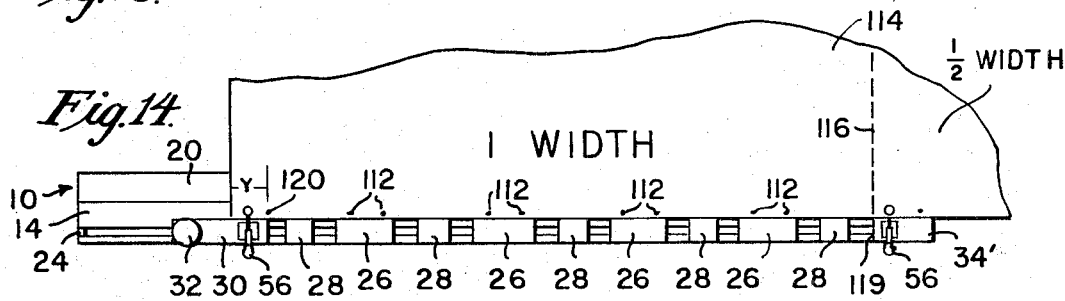
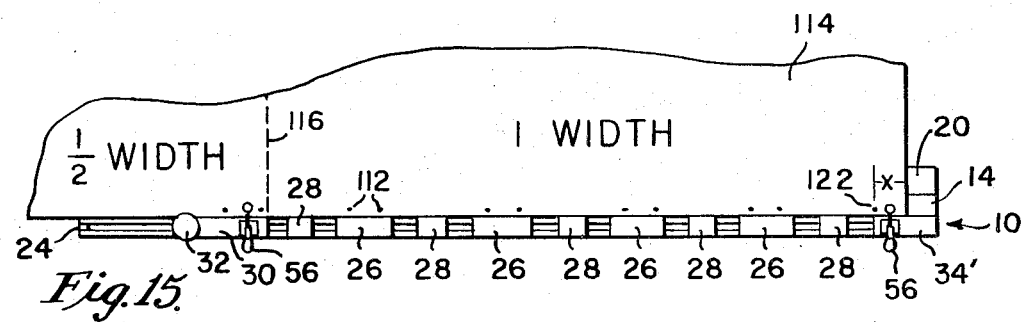
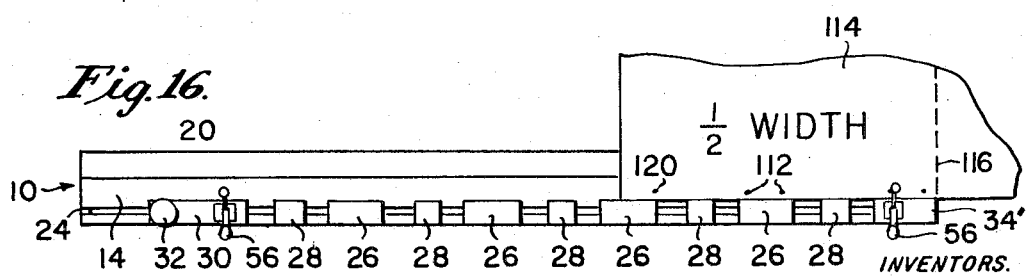

United States Patent Office 3,541,692
Patented Nov. 24, 1970

3,541,692
PLEATER GAUGE
Herbert Morantz, 1444 Wistar Drive, Wyncote, Pa. 19095, and Stanley Morantz, 9911 Haldeman Ave., Philadelphia, Pa. 19115
Filed Dec. 19, 1968, Ser. No. 785,150
Int. Cl. B431 9/08
U.S. Cl. 33—192                                   1 Claim

ABSTRACT OF THE DISCLOSURE

A pleater gauge including a body member having a top panel and an inclined panel, a track formed in the top panel and a series of movable guide blocks held captive in the track for sliding movement, the guide blocks being resiliently connected together so that the guide blocks can be pulled along the track in uniformly spaced relationship to each other, one of the guide blocks, known as the lead guide block, having a fastening knob to anchor the lead guide block at a desired place, clamping means formed on at least on of the guide blocks in order to hold an edge of a piece of drapery fabric, the inclined panel serving to facilitate the sliding of the drapery fabric onto the body member and adjacent the clamping means, and a marking tool which is centered in relationship to each one of the guide blocks in order to place pleat marks on the drapery fabric.

SPECIFICATION

This invention relates to a pleater gauge to indicate the placement of pleats on a drapery fabric, and more particularly to an improved device of this general class.

It is known to provide a class of devices that are intended to aid the operator in determining the location of pleats in the manufacture of custom draperies. The more simpler of such devices have not provided a satisfactory solution to the problem since the placement of pleats is a critical operation that must be performed with great accuracy. The problem of accuracy has been solved, but only by the provision of very complicated and expensive devices which have been beyond the financial reach of many drapery manufacturers.

The present invention provides a pleater gauge which is compatible with the economics of the drapery manufacturing business, while at the same time achieving the necessary accuracy, such that the present invention has already proved to be a very valuable tool.

It is a particular objective of the present invention to provide a pleater gauge which is relatively simple in construction, and yet will furnish the requisite accuracy in use.

Yet another object of the present invention is to provide a pleater gauge which is relatively maintenance free, and which will resist rough treatment in use.

Other objects and many of the attendant advantages of the present invention will be readily appreciated as the same becomes better understood by reference to the following detailed description when considered in connection with the accompanying drawings wherein:

FIG. 1 is a top elevational view of a pleater gauge embodying the persent invention, with the guide block fully extended as indicated by the tightened knob adjacent the left end of the pleater gauge as viewed in FIG. 1;

FIG. 2 is a front elevational view of the pleater gauge of FIG. 1;

FIG. 3 is a top elevational view of the pleater gauge of FIG. 1 but wherein the knob has been loosened so that the guide blocks have moved to a retracted position as allowed by their resilient connections;

FIG. 4 is a greatly enlarged view of the left portion of the pleater gauge of FIG. 1;

FIG. 5 is a sectional view taken along the lines 5—5 of FIG. 4;

FIG. 6 is a sectional view taken along the lines of 6—6 of FIG. 5;

FIG. 7 is a sectional view taken along the lines 7—7 of FIG. 5;

FIG. 8 is a greatly enlarged sectional view taken along the lines 8—8 of FIG. 1;

FIG. 9 is a perspective view covering same subject matter as FIG. 4, but with certain portions removed in order to shown normally hidden parts;

FIG. 10 is a fragmentary view of a portion of a pleater gauge chart which facilitates the use of the present invention;

FIG. 11 is a perspective view of a marking tool that is being set to a specific dimension as determined from the chart of FIG. 10;

FIG. 12 is a diagrammatic view showing the tool of FIG. 11 in use, in connection with the pleater gauge of the present invention for the purpose of laying out guide marks on a one width panel;

FIGS. 13 and 14 are diagrammatic views similar to FIG. 12 but showing the use of the present invention in connection with the right side of a one and one-half width panel; and FIGS. 15 and 16 are similar respectively to FIGS. 13 and 14, but showing the use of the present invention in connection with the left side of a one and one-half width panel.

Referring now in greater detail to the various figures of the drawing wherein like reference characters refer to like parts, there is shown in FIG. 1 a pleater gauge embodying the present invention. Reference is also made to FIGS. 4 and 9 as showing the details of the left side of the pleater gauge of the present invention when the guide blocks are fully extended. The details of the right side of the pleater gauge 10 of the present invention can be determined from an inspection of FIG. 8.

As indicated in FIG. 1 the pleater gauge 10 is basically an elongated body member 12, which is actual practice will be approximately five feet in length, although it is clear that other lengths will readily occur to those skilled in the art. As shown in FIG. 9 the body 12 includes a top panel 14, a bottom panel 16 and a back panel 18 which spans top and bottom panels 14 and 16. Inclined panel 20 also spans top and bottom panels 14 and 16, with the incline of panel 20 serving to expedite the movement of a piece of goods upon the top panel 14 and adjacent the guide blocks, as will be discussed in greater detail hereinafter.

As indicated in FIG. 5 the body member 12 is essentially hollow, but is closed in by end blocks 22 held by screws 23 extending into an end panel. One of the end blocks 22 can be seen in FIGS. 5 and 9. Some of the hollow space in the body member 12 is from time to time occupied by portions of the sliding guide blocks and spacers as will be discussed hereinafter.

It is to be noted as seen in FIG. 1 that an elongated slot or track 24 runs throughout practically the entire length of the top panel 14, and it is the track 24 which allows for the controlled sliding movement of the guide blocks 26 and spacers 28 which are held captive in the track.

As can be seen in FIG. 1 the guide blocks 26 are provided in an alternating manner, with each interior guide block 26 being interposed between a pair of spacers 28. There is also provided a lead guide block 30 which includes a tightening knob 32 for reasons that will soon be discussed. In addition to the foregoing, there is provided at the right side of the pleater gauge as viewed in FIG. 1 a stationary guide block 34'.

It will be seen that all of the guide blocks 26 including the lead guide block 30 as well as all of the spacers 28 are capable of undergoing a sliding action along the track 24. Only stationary guide block 34' does not move.

It will be observed from FIGS. 5 and 9 that all of the movable guide blocks as well as the spacers 28 are resiliently held together by resilient band means, such as a pair of resilient bands 34 and 36 as best viewed in FIGS. 4, 7 and 9 with the resilient bands being anchored at a distant point, such as stationary guide block 34'.

The cross-section area of a portion of the guide blocks and spacers which is located below top panel 14 and therefore generally hidden from view can be better understood by reviewing FIGS. 7 and 9. As seen in FIG. 7 the lead guide block 30 comprises an exposed portion 38 and a lower portion 40 which are connected together by a neck portion 42 that passes through the track 24.

It can be seen from FIG. 7 that the exposed portion 38 is essentially a platform. The lower portion 40 is essentially a block 44 having ledges 46 which define slots 48 that receive one of the resilient bands 34 or 36.

As indicated in FIG. 5 the resilient band will be anchored or otherwise attached as at 50 in the case of lead guide block 30 and at 52 in the case of spacer 28. This is done so that the various guide blocks and spacers will be slidable together in travelling from the retracted position of FIG. 3 to the extended position of FIG. 1 or to any intermediate point.

Similarly, when the knob 32 is loosened so that the pulling action of the resilient bands 34 and 36 is no longer restrained, the guide blocks and spacers will retract together toward the fully retracted position of FIG. 3.

As indicated in FIG. 6 the tightening knob 32 is secured to exposed portion 38 of lead guide block 30 by means of a bolt 50 which is preferably prevented from rotating relative to block 30 by being restrained in some functional way as for instance through the use of a glue or dope.

In this manner the knob 32 may be rotated together with the threaded stem of the bolt 50. Thus, the knob 32 can be rotated so as to draw the threaded stem 50 upwardly and thereby cause the upper ledges 46 of the lower block to engage the under surface of the upper panel 14.

As indicated in FIG. 6 when the knob 32 is tightened the upper surface 52 of the lower portion 40 will be caused to bind against the lower surface of top panel 14 or as further indicated in FIG. 6 to bind against certain strengthening folds 54 extending from the top panel 14.

In view of the tightening action of knob 32 it is possible to lock the various guide blocks and spacers in the extended form of FIG. 1 or at same intermediate position. It can be seen that the guide blocks and spacers can be freed from the locked position simply by loosening the knob 32 so that the pressure of the resilient bands 34 and 36 will initiate a retracting action.

As will be discussed when describing the manner in which the present invention is used, the lead guide block 30 will be extended against the pressure of resilient bands 34 and 36 for a predetermined length, and in order to hold the lead guide block at the particular position, the knob 32 will be tightened. Of course, when the lead guide block 30 is brought to the desired intermediate position, the other guide blocks 26 as well as the spacers 28 will be proportionately brought to an extended position, and will be essentially uniformly distributed.

In order to hold the drapery fabric upon the pleater gauge 10 of the present invention, there is provided, both on the lead guide block 30 as well as the stationary guide block 34' a clamping mechanism 56 which can be best understood through a review of FIGS. 7 and 9.

The clamping mechanism 56 is mounted upon the platform 38 of the lead guide block 30 and the stationary guide block 34' by means of screws 58 that extend through base 60 of the clamping mechanism. As seen in FIGS. 7 and 9 the base 60 includes a perpendicular wing portion 62, and there is a second wing portion 62, with the two wing portions 62 being generally parallel to each other as can be best seen in FIG. 8.

A lever 64 including handle portions 66 is provided, with the lever 64 being pivotally secured at 68 to the wing portions 62, so that the lever is secured for rocking movement. As can be further seen in FIG. 9 the lever 64 includes forked ends 70 which receive the stem 72 of an adjustable clamp 74. As can be seen in FIGS. 7 and 9 the clamp 74 terminates in a fabric engaging pad 76, with the pad 76 being adjustably mounted by means of threaded bolt 78 which is held in collars 80 (FIG. 7).

Finally, as can be seen in FIG. 1 a scale 82 is provided upon top panel 14. It is to be noted that the guide blocks 26, 30 and 34' each possess graduations in terms of fractions of an inch as well as inches for guidance of the operator as will be discussed hereinafter.

As shown in FIG. 11, the scale 82 is used in the operation of the present invention in connection with a marking tool 84 which is composed simply of a main bar 86 which holds blocks 88, with adjustment being provided by set screws 90. The blocks 88 possess openings which allow for the passage of pencils or marking devices 92, with set screws 94 also being provided for adjustment purposes.

As will be discussed hereinafter FIG. 10 shows a chart which facilitates the use of the present invention. The chart 96 possesses a first column 98 that corresponds to the number of widths of drapery fabric that are being handled. The second column 100 sets forth the number of spaces that will exist in the drapery between the pleats. The remainder of the chart 96 is devoted to a so-called number heading. Reference is made to a horizontal column 102 which starts with three inches. Although the next block moving from left to right as seen in FIG. 10 simply carries the number 1/16, this block is to be understood as being 3 1/16. Similarly, the next block will be understood as being 3 1/8, and the next block will be understood as being 3 3/16. This understanding continues as one moves from left to right in column 102.

With the foregoing understanding the next horizontal column 104 will be explained. The column 104 is simply a multiplication of a number in vertical column 100 and a number in horizontal column 102, where lines drawn through the columns 100 and 102 meet. For instance. the number 4 will be found in the column 100. The number 12 in column 104 is obtained by multiplying the aforesaid number 4 by the number 3 which appears in the column 102. The number 12 1/4 in column 104 was obtained by multiplying the aforesaid number 4 by the number 3 1/8 which appears in column 102.

It will be seen that the other numbers in horizontal columns 106, 108, etc. will be worked out in this way. Thus, the horizontal columns 104, 106, 108, etc. have been provided for the convenience of the operator, with the objective being to obtain the number in column 102 as will now be explained.

Reference is now made to FIG. 12 which shows the pleater gauge of the present invention in use for the purposes of laying out guide marks on a one width panel, with the guide marks being provided on the fabric in order to tell the operator where to make the pleats.

The first thing that the operator must do is to add the amount of the return and the overlap. This sum is deducted from the pinch pleat size in order to yield a number. For instance, if there is a 3 1/2 inch return and a 3 1/2 inch overlap, the sum of these two numbers will be 7 inches. If the finished pinch pleated width of drapery including the return and overlap is 20 1/4 inches, the aforesaid sum of 7 inches is then subtracted from 20 1/4 inches in order to yield an answer of 13 1/4 inches.

In the next step the number of 13 1/4 inches is located in the column for one width of FIG. 10. This is the column 104. Then, the operator reads up the column 102 in order to get an answer of 3 5/16 inches.

The pencils 92 of the tool 84 are then set apart from each other a width of 3 5/6 inches.

As seen in FIG. 12 the fabric 110 has been laid upon the device 10. In particular the left end of the fabric 110 is secured to the stationary block 34' in such a manner that the distance X as seen in FIG. 12 is equal to the amount of the return, which in the present example is 3½ inches. The lead block 30 is extended from right to left until the left edge of the fabric 110 can be clamped to the movable block 30 so that there will be an amount of goods Y as shown in FIG. 12 equal to the overlap, which in the present example is also 3½ inches. The knob 32 is now tightened to hold the guide blocks in the position of FIG. 12.

The operator then takes the marking tool 84 which has been set at 3 5/16 inches, as previously explained. The operator centers the marking tool on each guide block 26, using the inch and fractional inch markings on the guide block as appear in FIG. 4. When the operator has centered the marking tool 84, she makes a pair of dots 112 as will appear in FIG. 12. These are the dots which will guide the operator in making the pleats. The pair of dots made by marking tool 84 represents the distance between adjacent pleats.

The device of the present invention is usable with fabrics which are either narrower in width or wider in width. For instance, FIGS. 13, 14, 15 and 16 show the use of the device of the present invention in connection with a 1½ width panel 114.

Actually the use of the present invention for other size panels is essentially the same. For instance, the chart of FIG. 10 is used in precisely the same way in order to obtain the setting on the marking tool of FIG. 11. The next step is to find a ½ width of drapery for the right side, and then the material 114 is positioned on the device 10 as shown in FIG. 13. In this example the overlap and return will also be 3½ inches each.

The next step involves securing the righthand edge of the fabric to the stationary block 34' in such a way as to provide for the overlap which is the quantity X as indicated in FIG. 13. The lead block 30 is then pulled to the left in such a way that the third guide block (26–A) will be so aligned that the left edge 117 of the block 26–A will coincide with the line 116 which will either be a seam or some other indication of the left boundary of the ½ width section of goods. The marking tool is then utilized to make the dots 112 as previously discussed.

The fabric is unclamped and then shifted to the right so that the seam or boundary 116 lines up with the righthand edge 119 of stationary block 34' as seen in FIG. 14. The clamp 32 is then loosened and the lead block 32 pulled to the left so that the clamp 56 can be attached to the fabric to allow for the overlap as indicated by the letter Y in FIG. 14. The dots 112 are now laid out as previously described. Thus, the seam 116 will always fall behind a pleat and therefore will not be visible in the finished drapery.

The previous example has just covered the situation with 1½ widths where the ½ width seam was closer to the righthand edge of the fabric. FIGS. 15 and 16 show the use of the present invention where the ½ width seam is closer to the lefthand side. In this example the one with section of the goods is marked off first, with the seam 116 (FIG. 15) coinciding with the righthand edge of lead block 30. After the dots 112 have been applied as can be seen in FIG. 15, the material is unclamped and moved towards the right so that the seam 116 lines up with the righthand edge of stationary block 34 as can be seen in FIG. 16. The clamp 56 of the stationary block 34' is then reactivated to hold the fabric 114, and the dots 112 are applied. As can be further seen from an inspection of FIGS. 12 to 16, a dot 120 and 122 is applied to indicate the return and the overlap.

It therefore can be seen that the pleater gauge of the present invention provides a simple tool that enables the operator to apply to a drapery fabric marks that will enable her easily to make pleats at proper places to produce a quality drapery. The present invention is relatively maintenance free, and the hidden parts are easily accessible.

With reference to FIGS. 13 to 16 it should be noted that one set of dots 112 is placed closely adjacent to the seam 116. In this way, the seam will not be readily visible in the finished drapery since it will fall close to the pleat and therefore will tend to be obscured by the folds of the pleat.

Without further elaboration, the foregoing will so fully illustrate our invention that others may, by applying current or future knowledge, adopt the same for use under various conditions of service.

What is claimed as the invention is:

1. A pleater gauge to indicate the placement of pleats on a drapery fabric comprising an elongated body member having a top and bottom panel each having two longitudinal edges connected at one edge by a back panel, said top and bottom panels also being connected by an inclined panel at the other edges, said body member being essentially hollow, a longitudinal track formed in said top panel, a plurality of movable guide blocks having fractional inch indicators thereon spaced from one another and held captive in said track for sliding movement as permitted by said track, said guide blocks being resiliently connected by resilient band means having one end anchored at a stationary guide block to said body member, said reslient band means being secured to said guide blocks, so that said guide blocks may be pulled along said track in uniformly spaced relationship to each other, a spacer member interposed between each pair of adjacent guide blocks with said resilient band connecting said guide blocks and spacer members in alternating fashion wherein said guide blocks and spacer members are slidable together in travelling from a retracted to an extended position, one of said guide blocks which is most remote from said distant point being known as the lead guide block, said lead guide block having a fastening knob in order to anchor said lead guide block at a desired place along said track and against the pressure of said resilient band means and thereby maintain such guide blocks in a desired relationship with respect to each other, clamping means for a drapery fabric mounted on said lead guide block and said stationary guide block, said guide blocks including a platform portion spaced a slight distance above said top panel with said fastening knob and clamping means being mounted on said platform, said inclined panel serving to facilitate the sliding of said drapery fabric onto said body member and said clamping means, a marking tool having spaced apart marking means which are to be centered in relationship to each of said guide blocks in order to place a pair of pleat marks on said drapery fabric, said pleat marks being each centered on one of said guide blocks, the distance between a mark in a first pair of marks and the closest mark in an adjacent pair of marks representing the distance between adjacent pleats in the finished drapery with one of said spacer members falling between said distance.

References Cited

UNITED STATES PATENTS

| 2,542,561 | 2/1951 | Olejniczak | 33—158 |
| 2,871,567 | 2/1959 | Casten | 33—192 |
| 2,885,784 | 5/1959 | Fox | 33—12 |
| 2,999,321 | 9/1961 | McAllister | 33—180 |

LEONARD FORMAN, Primary Examiner

A. J. MIRABITO, Assistant Examiner